United States Patent
Aoki

(10) Patent No.: US 7,275,984 B2
(45) Date of Patent: Oct. 2, 2007

(54) AIR CONDITIONING UNIT FOR SEAT

(76) Inventor: Shinji Aoki, DENSO Corporation, 1-1, Showa-cho, Kariya-city, Aichi-pref. (JP) 448-8661

( * ) Notice: Subject to any disclaimer, the term of this patent is extended or adjusted under 35 U.S.C. 154(b) by 0 days.

(21) Appl. No.: 11/472,266

(22) Filed: Jun. 21, 2006

(65) Prior Publication Data

US 2006/0290176 A1     Dec. 28, 2006

(30) Foreign Application Priority Data

Jun. 27, 2005     (JP) ............................. 2005-186269

(51) Int. Cl.
*B60N 2/56*     (2006.01)
*A47C 7/74*     (2006.01)

(52) U.S. Cl. .................. 454/120; 454/907; 297/180.1; 297/180.13; 297/180.14

(58) Field of Classification Search ................ 454/120, 454/907; 297/180.1, 180.13, 180.14, 344.18, 297/452.42
See application file for complete search history.

(56) References Cited

U.S. PATENT DOCUMENTS

| | | | | |
|---|---|---|---|---|
| 5,284,455 | A * | 2/1994 | Kuribayashi | ................ 464/105 |
| 5,524,439 | A   | 6/1996 | Gallup et al. | |
| 5,626,021 | A   | 5/1997 | Karunasiri et al. | |
| 5,934,748 | A * | 8/1999 | Faust et al. | ............. 297/180.12 |
| 6,048,024 | A * | 4/2000 | Wallman | ................ 297/180.14 |
| 6,059,018 | A * | 5/2000 | Yoshinori et al. | ............. 165/42 |
| 6,062,641 | A * | 5/2000 | Suzuki et al. | ............ 297/180.1 |
| 6,478,369 | B1  | 11/2002 | Aoki et al. | |
| RE38,128  | E   | 6/2003 | Gallup et al. | |
| 6,604,785 | B2* | 8/2003 | Bargheer et al. | ....... 297/180.14 |
| 6,719,534 | B2* | 4/2004 | Aoki | ......................... 417/44.1 |
| 6,736,452 | B2* | 5/2004 | Aoki et al. | ............ 297/180.13 |
| 2001/0004008 | A1* | 6/2001 | Aoki et al. | ................... 165/43 |
| 2004/0090093 | A1* | 5/2004 | Kamiya et al. | ......... 297/180.14 |
| 2004/0139754 | A1* | 7/2004 | Kamiya et al. | ................ 62/186 |
| 2004/0164594 | A1* | 8/2004 | Stoewe et al. | ......... 297/180.14 |
| 2004/0198212 | A1* | 10/2004 | Aoki et al. | ................. 454/120 |

FOREIGN PATENT DOCUMENTS

JP          56-35406          8/1954

(Continued)

*Primary Examiner*—Kenneth Rinehart
*Assistant Examiner*—Patrick F O'Reilly, III
(74) *Attorney, Agent, or Firm*—Harness, Dickey & Pierce, PLC

(57) ABSTRACT

An air conditioning unit for introducing air to a surface of a seat back has a first air guide, a second air guide and a flexible connecting part. The first air guide is disposed on a rear side of a cushion member of the seat back to follow an elastic deformation of the cushion member. An upstream portion of the first air guide defines an inlet port. A downstream portion of the first air guide communicates with a seat back opening formed in the cushion member. The second air guide is disposed on a back board, which is located on the rear side of the cushion member with a space. The second air guide has an inlet port at an upstream portion thereof and an outlet port at a downstream end thereof. The flexible connecting part flexibly connects the outlet port of the second air guide and the inlet port of the first air guide.

7 Claims, 5 Drawing Sheets

FOREIGN PATENT DOCUMENTS

| | | | | |
|---|---|---|---|---|
| JP | 05277020 A | * 10/1993 | ............ | 297/180.14 |
| JP | 09105226 A | * 4/1997 | ................ | 138/114 |
| JP | 10-297275 | 11/1998 | | |
| JP | 2002-225539 | 8/2002 | | |
| JP | 2003-252036 | 9/2003 | | |
| JP | 2004-224108 | 8/2004 | | |

* cited by examiner

AIR CONDITIONING UNIT FOR SEAT

CROSS REFERENCE TO RELATED APPLICATION

This application is based on Japanese Patent Application No. 2005-186269 filed on Jun. 27, 2005, the disclosure of which is incorporated herein by reference.

FIELD OF THE INVENTION

The present invention relates to an air conditioning unit for introducing air to a surface of a seat back of a seat.

BACKGROUND OF THE INVENTION

A seat air conditioning unit that blows a conditioned air from openings of a seat back toward a hip or back of a person sitting on a seat has been conventionally known. This kind of seat air conditioning unit is for example disclosed in Japanese Patent Publication No. 10-504977 (U.S. Pat. Nos. 5,524,439, 5,626,021, Pat. No. Re. 38,128E). In the seat air conditioning unit disclosed in the above publication, air having passed through a Peltier module is introduced to the openings of the seat back through a duct.

In a seat air conditioning unit, an air ventilation system including such as a blower and a duct for leading a conditioned air to a surface of the seat back is mounted to the seat back. In general, the seat back receives a load (weight) from a person sitting on the seat. To protect such an air ventilation system and improve an appearance of the seat back, the air ventilation system is for example mounted in a space defined between a rear side of a cushion member of the seat back and a back board disposed on the rear side of the seat back.

However, the space between the cushion member and the back board is relatively small. As such, a passage space of the duct is limited. With this, a pressure loss of the air in the duct is likely to increase. Further, the cushion member of the seat back elastically deforms in a rear direction according to the load applied to the seat back. With this, the space between the cushion member and the back board changes. When the duct is deformed or bent with the elastic deformation of the cushion member, the pressure loss in the duct increases. As a result, it is difficult to sufficiently provide a comfortable air feeling to the person.

SUMMARY OF THE INVENTION

The present invention is made in view of the foregoing matter, and it is an object to provide an air conditioning unit capable of effectively introducing air to a surface of a seat back of a seat without increasing a pressure loss in an air passage member irrespective of an elastic deformation of the seat back.

According to an aspect of the present invention, the air conditioning unit has a first air guide, a second air guide, and a flexible connecting part. The seat back has a cushion member formed with a seat back opening through which air flows and a back board disposed on a rear side of the cushion member with a space. The first air guide is disposed on the rear side of the cushion member to follow an elastic deformation of the cushion member. The first air guide defines an air passage therein and has an upstream portion and a downstream portion. The upstream portion defines an inlet port through which air is introduced in the first air guide. The downstream portion is disposed to communicate with the seat back opening of the cushion member. The second air guide is disposed on the back board in the space. The second air guide defines an air passage therein. The second air guide has an upstream portion defining an inlet port through which air is introduced in and a downstream portion defining an outlet port. The flexible connecting part flexibly connects the outlet port of the second air guide and the inlet port of the first air guide according to the elastic deformation of the cushion member. The flexible connecting part defines an air passage between the outlet port of the second air guide and the inlet port of the first air guide.

For example, when a pressure in a rear direction such as by a load (weight) of a person on the seat is applied to the seat back, the cushion member is deformed in a rearward direction. In such a case, even if the space between the cushion member and the back board is reduced, the flexible connecting part flexibly connects the outlet port of the second air guide and the inlet port of the first air guide while maintaining the air passage between them. Thus, the air is effectively introduced from the inlet port of the second air guide to the seat back opening through the flexible connecting part.

Namely, even if the cushion member is elastically deformed, an air leakage in the air passage between the second air guide and the first air guide is reduced by the flexible connecting part. Also, it is less likely that an air flow resistance in the air passage between the second air guide and the first air guide will increase. Namely, a pressure loss in the air passage is not increased. Accordingly, a conditioned air is effectively blown to the surface of the seat back from the seat back opening.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

Figure 1:
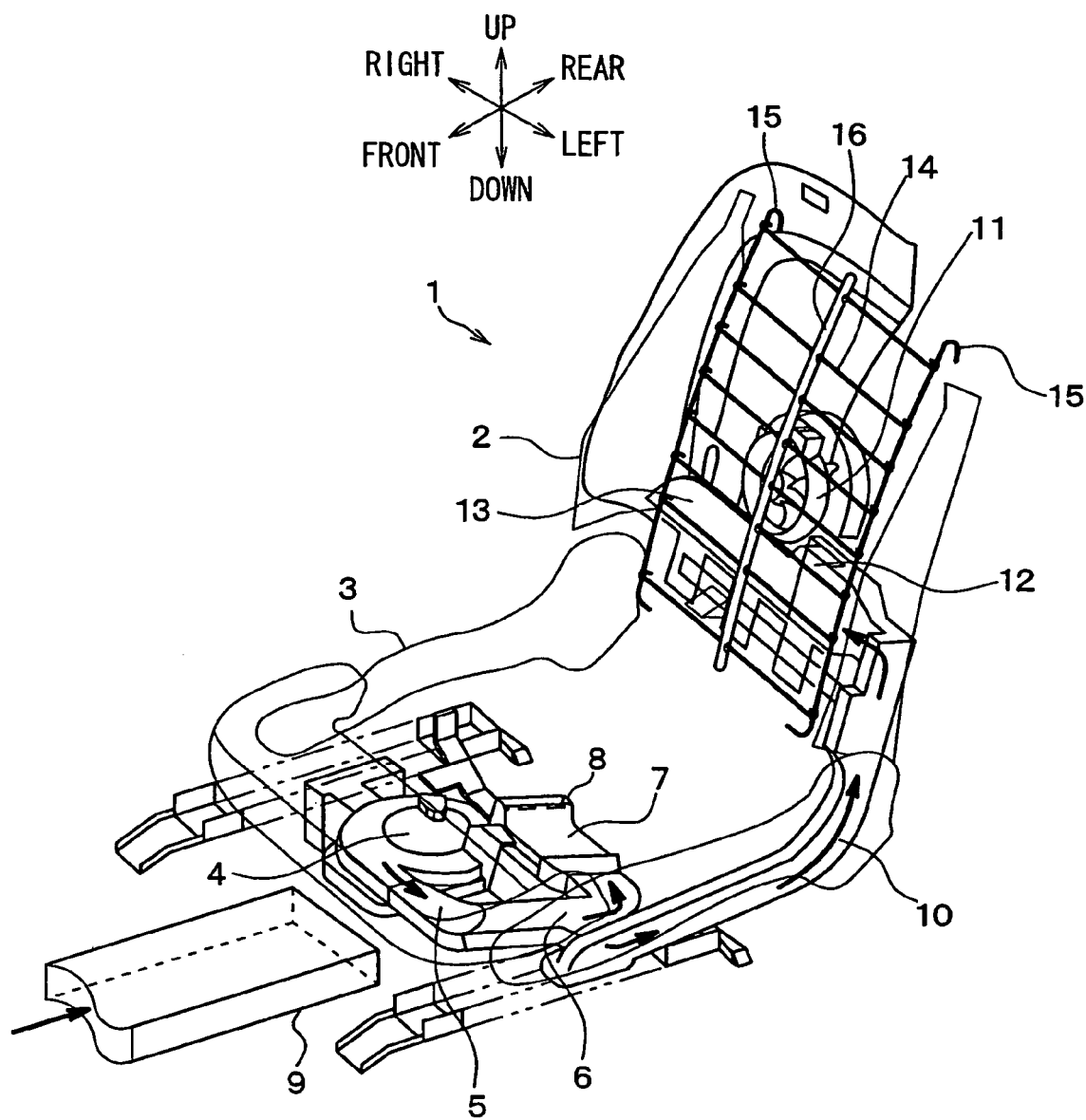
FIG. 1 is a schematic view of a frame structure of a seat and a seat air conditioning unit mounted to the seat according to an example embodiment of the present invention.

A first example embodiment of the air conditioning unit for introducing air to a surface of a seat back will now be described with reference to FIGS. 1 to 4. A seat shown in FIG. 1 is a front seat mounted in a passenger compartment of a vehicle, for example. In FIGS. 1 to 4, arrows denote arrangement directions of a seat with respect to the vehicle.

As shown in FIG. 1, the air conditioning unit is mounted to a seat frame 1 of the seat. The seat has a seat back 2 and a seat cushion 3. The seat back 2 generally receives a load from a back of a passenger sitting on the seat. The seat cushion 3 generally receives a weight of the passenger, in particular a load from a lower half body of the passenger.

A cushion fan 4 is mounted to a frame of the seat cushion 3 under the seat cushion 3. An air passage member 5 is provided at a discharge portion of the cushion fan 4. The cushion fan 4 sucks air (inside air) existing around or under the seat cushion 3 and blows the air into the air passage member 5. The air passage member 5 connects to a cushion Peltier module (hereafter, referred to as a first Peltier module) 7 disposed in the seat cushion 3. The air passage member 5 is provided with a branch part 6. An air distribution duct 10 extends from the branch part 6 to the seat back 2. Accordingly, the air blown by the cushion fan 4 is introduced toward the first Peltier module 7 and into the air distribution duct 10.

The first Peltier module 7 has a Peltier element as a thermoelectric element, and provides a heat exchanging part. The air introduced into the Peltier module 7 is cooled or heated according to a direction of an electric current flowing in the Peltier element.

The air, which has been conditioned while passing through the Peltier module 7, is introduced to a cushion air blowing port (not shown) formed in a cushion member of the seat cushion 3 from a Peltier air blowing port 8. The air is further blown to a seat cover of the seat cushion 3 from the cushion air blowing port. Accordingly, the conditioned air is supplied to the lower half body of the passenger on the seat. Hereafter, a description will be made based on a condition in which the air conditioning unit performs a cooling operation, that is, in a condition in which air is cooled through the first Peltier module 7 and a seat back Peltier module (hereafter, referred to as a second Peltier module) 12.

A rear foot duct 9 is provided such that its opening is open under the seat cushion 3 and above a floor of the vehicle. The rear foot duct 9 is provided to introduce a conditioned air produced in a compartment air conditioning unit (not shown) to a lower area (foot area) of a rear passenger seat. The compartment air conditioning unit is for example mounted at a front part of the compartment. For example, when the compartment air conditioning unit is operated in a full open mode in which the conditioned air is blown from all air blowing ports, in a cooling operation, a cooled air is blown to a space under the seat cushion 3 from the rear foot duct 9.

The cushion fan 4 sucks the cooled air discharged from the rear foot duct 9 and blows it to the first Peltier module 7 and into the air distribution duct 10. As such, a cooling capacity of each of the first Peltier module 7 and the second Peltier module 12 further improves.

Figure 2:
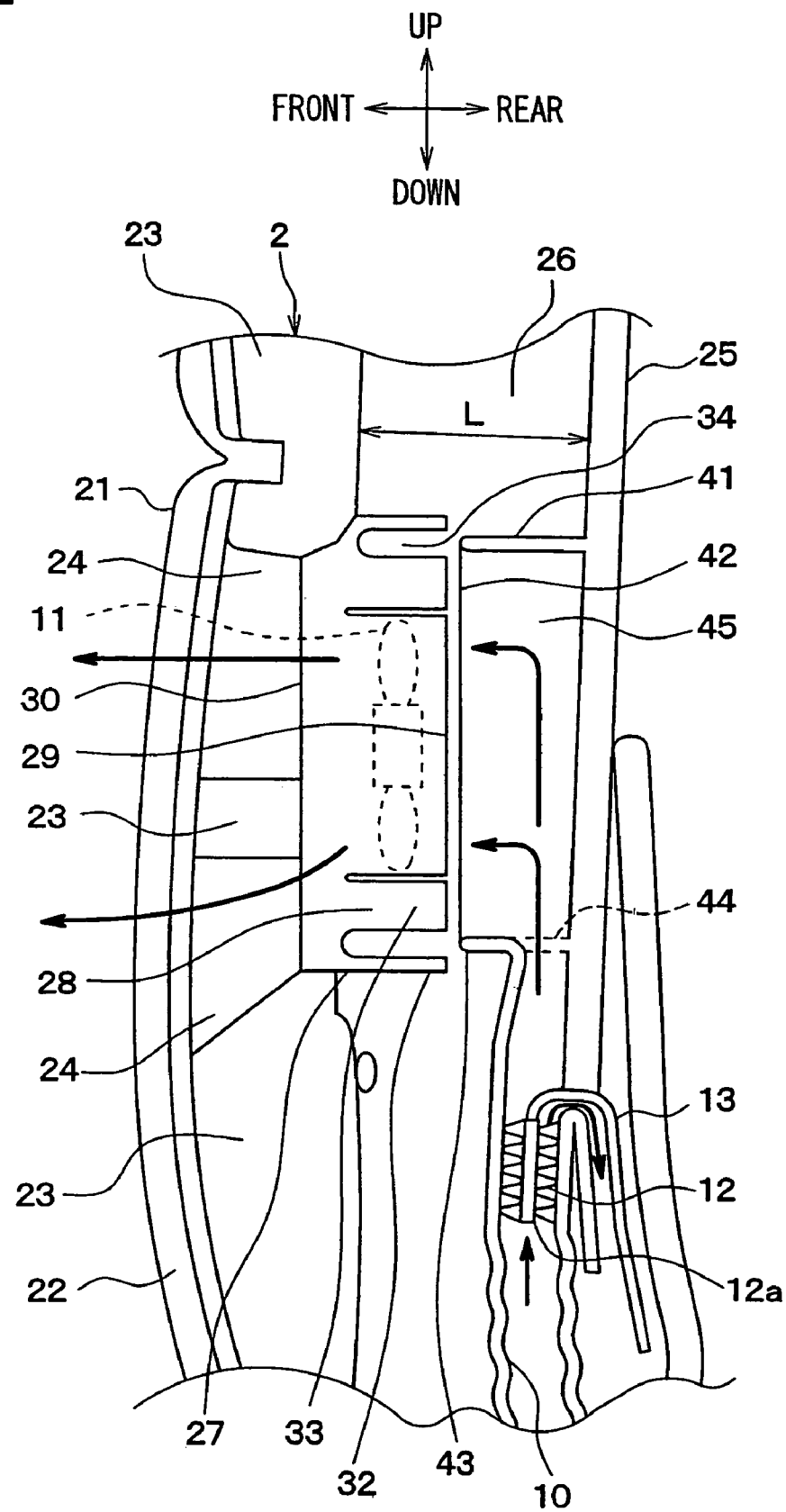
FIG. 2 is a schematic explanatory view of a part of a seat back of the seat according to the example embodiment of the present invention.
Figure 3A:
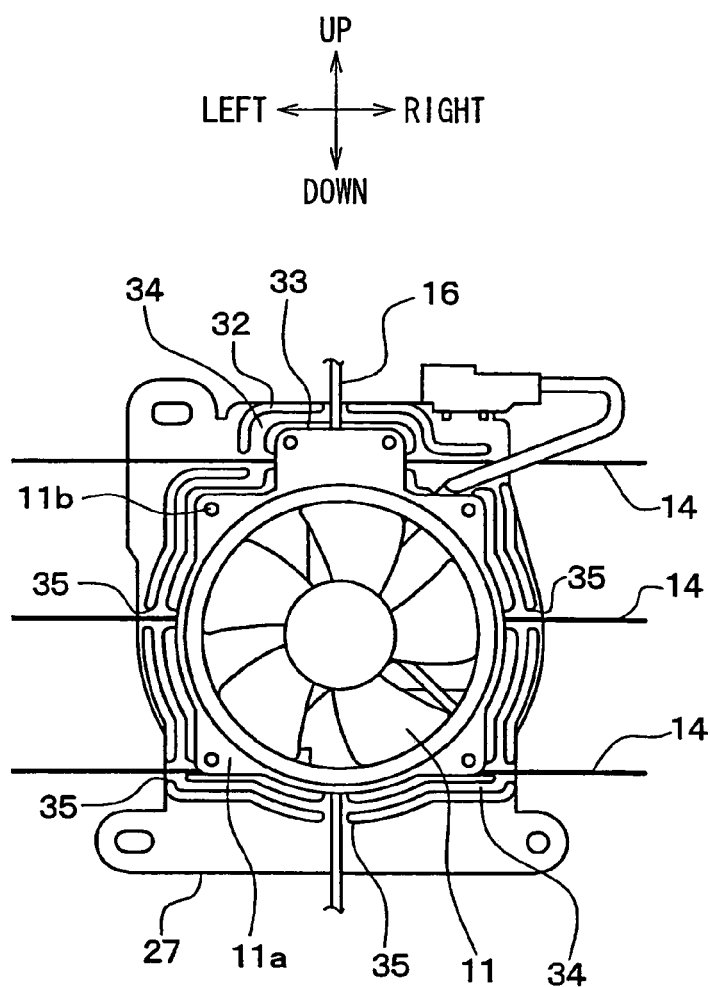
FIG. 3A is a plan view of a first air guide mounted to a seat spring of the frame structure, when viewed from a rear side of the seat, according to the example embodiment of the present invention.
Figure 3B:
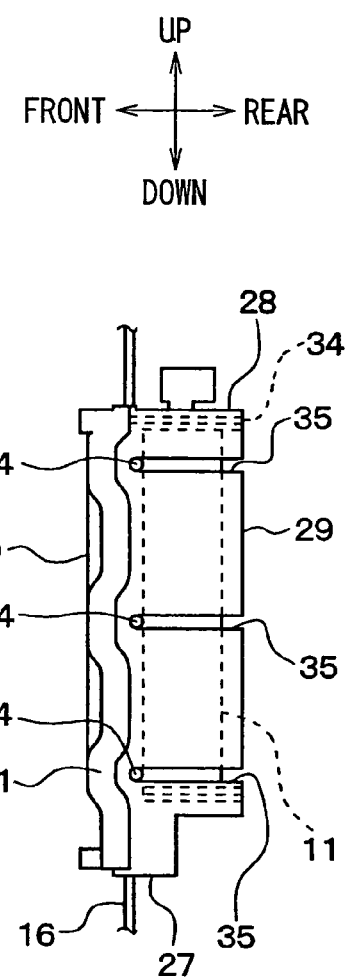
FIG. 3B is a side view of the first air guide shown in FIG. 3A.

The seat air conditioning unit further includes a back fan 11, the second Peltier module 12 and a discharge duct 13 in the seat back 2. As shown in FIGS. 1 to 3, the back fan 11 is mounted to seat springs 14 and a middle frame 16 of the seat back 2 together with a back bracket 27. The back bracket 27 is used as a fixing member. For example, a fan case 11a of the back fan 11 is fixed to the back bracket 27 while interposing the seat springs 14 and the middle frame 16 between the fan case 11a and the back bracket 27.

The seat springs 14 are metallic wires. Right and left ends of each seat spring 14 are connected to and supported by right and left seat back frames 15, respectively. The seat back frames 15 are made of metal and are disposed in the frame of the seat back 2. The seat back frames 15 are disposed to extend substantially in a vertical direction on the rear side of a cushion member 23 of the seat back 2.

The middle frame 16 extends substantially in the vertical direction between the right and left seat back frames 15. The middle frame 16 is a metallic pipe member. Small holes are formed in the middle frame 16 at intervals. The wire seat springs 14 pass through the small holes of the middle frame 16 and extend in a transverse direction of the seat. Accordingly, the middle frame 16 supports the substantially middle portions of the seat springs 14.

The seat springs 14, the seat back frame 15 and the middle frame 16 construct a frame structure of the seat back 2 on the rear side of the cushion member 23. This frame structure serves as a reinforcement member for maintaining the shape of the seat back 2.

As such, even if a force is applied to the seat back 2 in a rearward direction due to the load of the upper half body of the passenger and an acceleration of the vehicle, the cushion member 23 and other members can be elastically, displaceably supported by the frame structure. That is, the frame structure generates flexibility against the force.

As shown in FIG. 3, the back bracket 27 is a resin member and provided to mount the back fan 11 to the seat springs 14. Further, a first air guide 28 is integrally formed with the back bracket 27.

For example, the first air guide 28 is constructed of an outer rib 32 and an inner rib 33 extending from a rear surface of a base of the back bracket 27. As shown in FIG. 3A, the inner rib 33 has a shape corresponding to an outer shape of the fan case 11a. Thus, when the fan case 11a is connected to the back bracket 27, the inner rib 33 meets the outer periphery of the fan case 11a.

The outer rib 32 is formed on an outer peripheral part of the inner ribs 33 with a space. Namely, a recessed portion 34 is formed between the outer rib 32 and the inner rib 33 to smoothly, slidably receive a rib 43 of a second air guide 41. The space between the outer rib 32 and the inner rib 33 is larger than a thickness of a wall of the rib 43. The ends of the outer rib 32 and the inner rib 33 form an inlet port 29 of the first air guide 28.

Further, each of the outer rib 32 and the inner rib 33 is formed with plural cutout portions 35 to allow the seat springs 14 and the middle frame 16 to pass through in the transverse and the vertical direction.

The back fan 11 and the back bracket 27 are assembled to the frame structure of the seat back 2 in a following manner. First, the back bracket 27 is placed to the frame structure from a front side of the frame structure such that the seat springs 14 and the middle frame 16 pass through the cutout portions 35. In this condition, the back fan 11 is placed to the back bracket 27 from a rear side such that the outer periphery of the fan case 11a meets the inner periphery of the inner rib 33. Then, the fan case 11a is fixed to the back bracket 27. For example, the fan case 11a is formed with fixing holes 11b and is connected to the back bracket 27 by using screws through the fixing holes 11b.

As shown in FIG. 2, in the seat back 2, a back board 25 is provided on the rear side of the cushion member 23 to protect the rear side of the seat back 2. The back board 25 is made of resin, and substantially extends in the vertical direction. The back board 25 forms a space 26 between itself and the rear surface of the cushion member 23. The space 26 has a length in the vertical direction.

In the condition that the back bracket 27 and the back fan 11 are mounted to the frame structure on the rear side of the cushion member 23, the first air guide 28 is located in the space 26. Also, a packing 31 as a sealing member is disposed between the rear surface of the cushion member 23 and the back bracket 27 forming the first air guide 28. In FIG. 2, the first air guide 28 is simply illustrated.

The back bracket 27 forms an outlet port 30 at a downstream of the first air guide 28. The back bracket 27 is disposed such that the outlet port 30 opens to seat back openings 24 formed in the cushion member 23. The cushion member 23 forms a main pad of the seat back 2. A front surface of the cushion member 23 is covered with an air breathable seat cover pad 22 and an air breathable seat cover 21. The seat cover 21 forms an outer surface of the seat back 2.

Since the back fan 11 is supported by the back bracket 27, a distance between the back fan 11 and the seat cover 21 is reduced. As such, the conditioned air, which is sucked from the inlet port 29 of the first air guide 28, is effectively blown to the back or hip of the passenger through the seat cover 21 from the outlet port 30 and the seat back openings 24.

The second air guide 41 is integrally formed with the back board 25. The second air guide 41 is located in the space 26. The second air guide 41 forms an air collecting space 45 and the rib 43 at a downstream end thereof. The rib 43 of the second air guide 41 has a shape corresponding to the outer shape of the inner rib 33 of the first air guide 28 such that the rib 43 is received in the recessed portion 34 formed between the outer rib 32 and the inner rib 33. The rib 43 forms an outlet port 42 at a downstream of the air collecting space 45. The outlet port 42 is open to the cushion member 23.

Further, the second air guide 41 forms an inlet port 44. A downstream end of the air distribution duct 10, which extends from the air passage member 5 along the back board 25, connects to the inlet port 44. Accordingly, the air flowing in the air distribution duct 10 is introduced in the air collecting space 45 through the inlet port 44. Then, the air is sucked by the back fan 11 through the outlet port 42 and is blown toward the seat cover 21 through the seat back openings 24.

The second Peltier module 12 is arranged adjacent to the downstream end of the air distribution duct 10, which connects to the second air guide 41. The second Peltier module 12 has a structure similar to that of the first Peltier module 7. The second Peltier element 12 has a Peltier element 12a. When the Peltier element 12a is electrically conducted, it performs heat exchange with the air passing through the Peltier module 12. Namely, the Peltier element 12a absorbs heat from air on one side and transfers the heat to the air passing through the opposite side of the Peltier element 12a.

For example, the air passing through one side of the Peltier element 12a is cooled. The cooled air is further introduced into the air collecting space 45 from the inlet port 44 of the second air guide 41.

On the contrary, the air passing through the opposite side of the Peltier element 12a receives heat and is discharged to a region without affecting an air conditioning operation. For example, a heat discharge duct 13 is connected to the air distribution duct 10 on the opposite side of the Peltier element 12a. The air having passed through the opposite side of the Peltier element 12a is discharged to a rear region of the seat back 2 through the heat discharge duct 13.

Next, a structure of a flexible connecting part (movable connecting part) for connecting the first air guide 28 and the second air guide 41 will be described. The first air guide 28 and the second air guide 41 are coupled through the double ribs 32, 33 and the rib 43. The double ribs 32, 33 and the rib 43 engage and slide relative to each other while defining an air passage between the outlet port 42 and the inlet port 29.

Namely, the double ribs 32, 33 of the first air guide 28 and the rib 43 of the second air guide 41 correspond to the flexible connecting part. Also, the double ribs 32, 33 and the rib 43 are relatively engaged to form a labyrinthine structure. In FIG. 2, the first air guide 28 and the second air guide 41 are slightly spaced from each other, for convenience of explanation.

In a normal condition, that is, when the cushion member 23 is not deformed, the first air guide 28 and the second air guide 41 are arranged such that the double ribs 32, 33 and the rib 43 slightly overlap, to thereby form the labyrinthine structure. By the labyrinthine structure, air leakage in the air passage defined in the flexible connecting part reduces. In a condition that the cushion member 23 of the seat back 2 is not or almost not deformed, a distance L between the rear surface of the cushion member 23 and the inner surface of the back board 25 is the largest.

Figure 4:
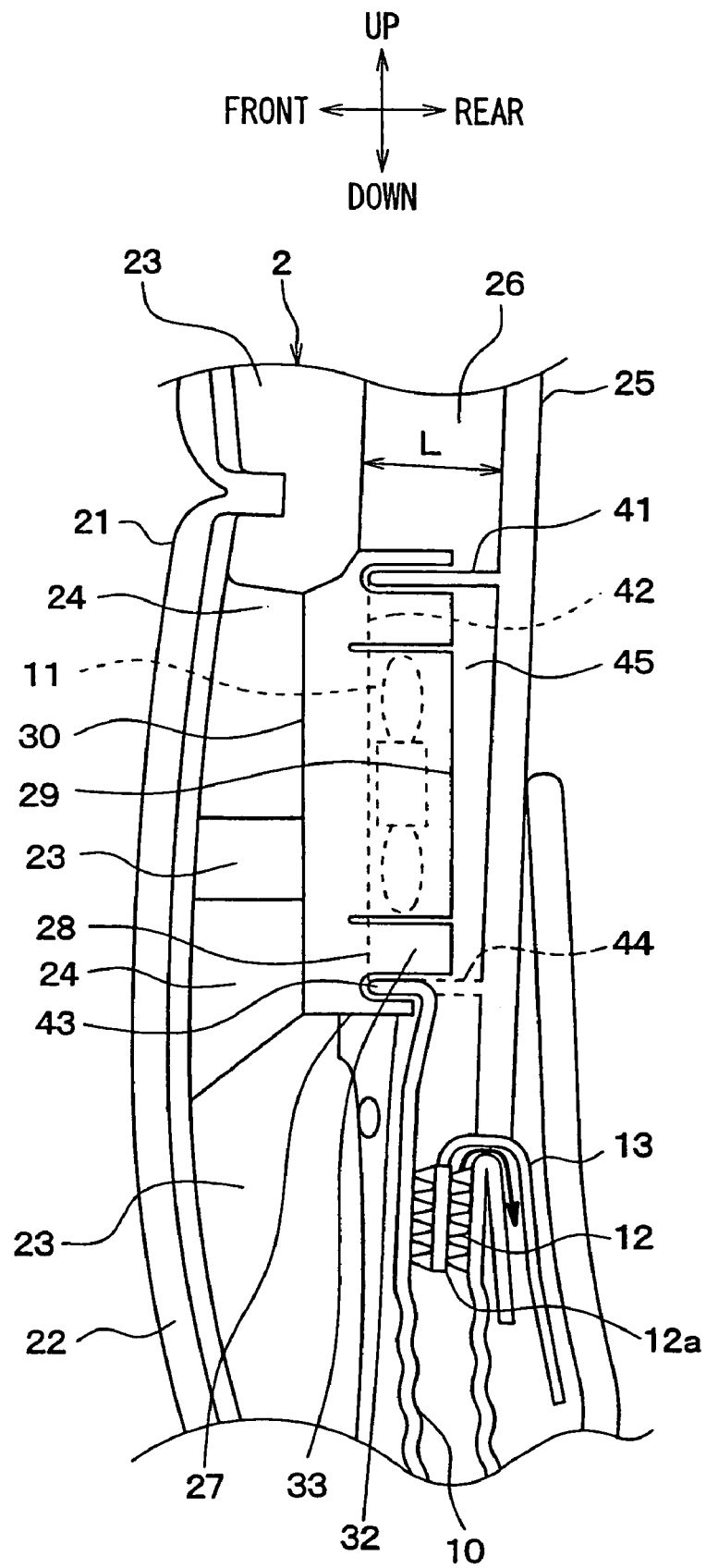
FIG. 4 is a schematic explanatory view of the seat back when a cushion member of the seat back is deformed in a rearward direction.

When the seat back 2 receives the load from the passenger, or the vehicle is accelerated, the cushion member 23 is deformed in the rear direction. Thus, the distance L is reduced. With the deformation of the cushion member 23, the first air guide 28 is also moved in the rear direction. At this time, the double ribs 32, 33 move with respect to the rib 43 of the second air guide 41. FIG. 4 shows a condition that the first air guide 28 is moved in the rear direction most.

Further, the bulk of the air collecting space 45, which is surrounded by a rear portion of the back fan 11 and the wall of the rib 43, reduces. However, the labyrinthine structure is formed by the double ribs 32, 33 and the rib 43. As such, air leakage from the air collecting space 45 is suppressed. Further, it is less likely that a resistance of air flow from the inlet port 44 to the outlet port 30 of the first air guide 28 will change. Accordingly, it is less likely that the suction volume of air by the back fan 11 from the air collecting space 45 will change.

Namely, the volume of air flowing in the air collecting space 45 is not affected by the change of the bulk of the air collecting space 45. The volume of air flowing in the air collecting space 45 is maintained according to the operation condition of the cushion fan 4, that is, maintained by the volume of air blown by the cushion fan 4. The back fan 11 sucks a predetermined volume of air from the air collecting space 45 and blows it toward the seat cover 21.

In the example embodiment, the first air guide 28 is supported to follow the elastic deformation of the cushion member 23 together with the back fan 11. The inlet port 29 of the first air guide 28 and the outlet port 42 of the second air guide 41 form the flexible connecting part. The inlet port 29 of the first air guide 28 slidably engages with the outlet port 42 of the second air guide 41 while forming the labyrinthine structure between them.

As such, air leakage in the air passage from the second air guide 41 to the first air guide 28 is reduced. Also, the air flow resistance is not increased in the air passage. Accordingly, a predetermined volume of air is blown to the seat cover 21 by the operation of the back fan 11, irrespective of the degree of deformation of the cushion member 23.

Further, the first air guide 28 and the second air guide 41 are connected in a condition that the movement of the first air guide 28 relative to the second air guide 41 is allowed through the connecting portions, i.e., the double ribs 32, 33 and the rib 43. Accordingly, the air passage capable of reducing air leakage is formed without increasing the number of connecting parts, even in a variable, small space 26.

The structure of the flexible connecting part is not limited to the structure shown in FIGS. 2 to 4. In the example embodiment shown in FIGS. 2 to 4, the flexible connecting part is formed by engaging the inlet port 29 of the first air guide 28 and the outlet port 42 of the second air guide 41. Alternatively, as shown in FIG. 5, the flexible connecting part can be provided by a bellows duct 50 having a flexible structure.

Figure 5:
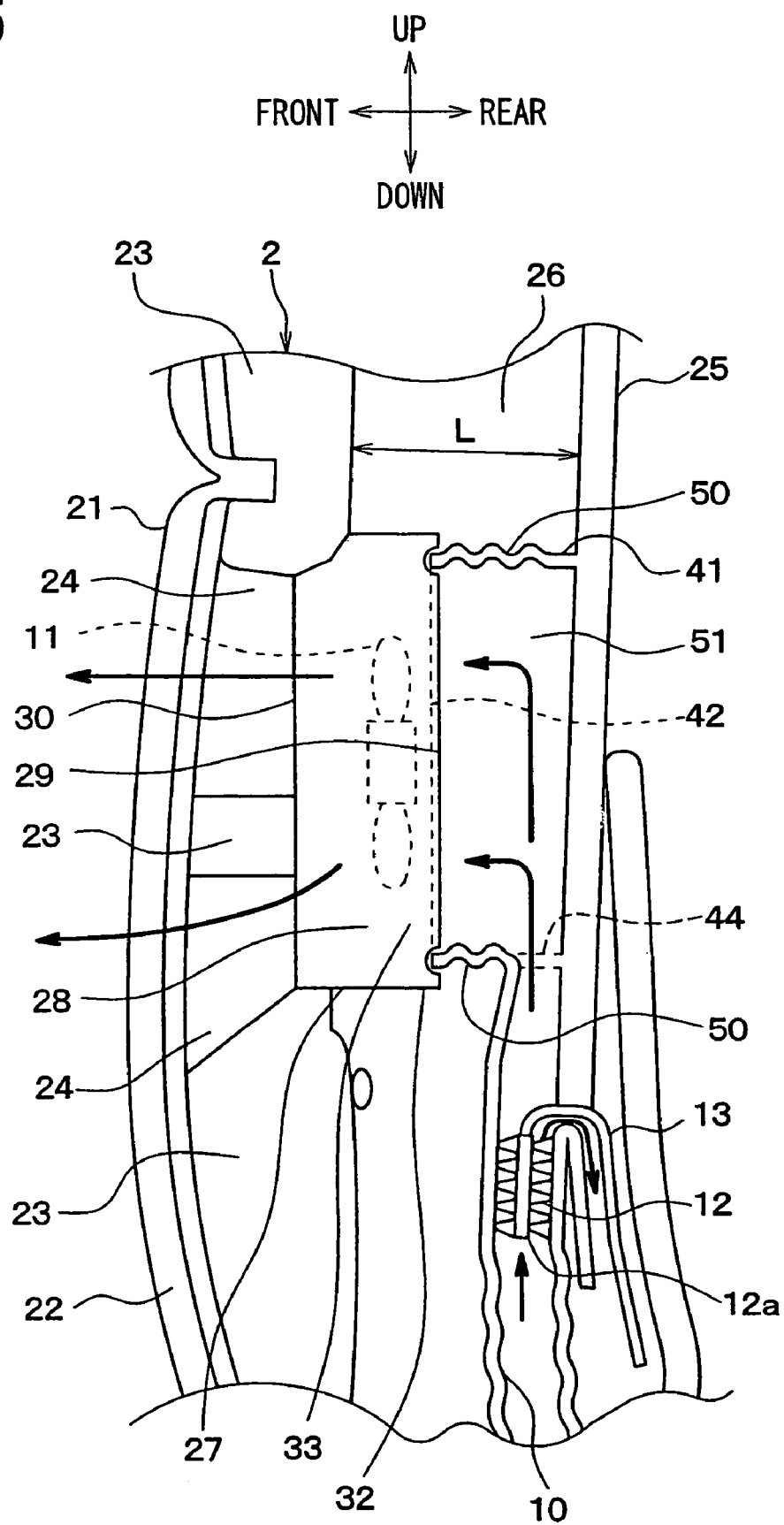
FIG. 5 is a schematic explanatory view of the seat back for showing a flexible connecting part between a first air guide and a second air guide according to a modification of the example embodiment.

In the example shown in FIG. 5, the bellows duct 50 is formed to extend from the back board 25. The bellows duct 50 forms the air collecting space 51 therein. An end of the bellows duct 50 forms the outlet port 42 and connects to the inlet port 29 of the first air guide 28, such that the air collecting space 51 communicates with the back fan 11. When the distance L between the cushion member 23 and the back board 25 reduces due to the backward deformation of the cushion member 23, the bellows duct 50 is deformed and contracted. With this, the bulk of the air collecting space 51 also reduces.

At this time, it is less likely that the air will leak from the air collecting space 51. Also, it is less likely that the air flow resistance from the inlet port 44 of the second air guide 41 to the front opening 30 of the first air guide 28 will change. As such, the suction volume of air by the back fan 11 will not be affected. Therefore, the conditioned air is sufficiently blown by the back fan 11 with a predetermined volume, irrespective of the amount of deformation of the cushion member 23.

In the example embodiment shown in FIGS. 2 to 4, the double ribs 32, 33 are formed on the first air guide 28. Alternatively, the double ribs can be formed on the second air guide 41. Further, it is not always necessary to form the ribs in double layers on one of the first air guide 28 and the second air guide 41. For example, the outer rib 32 can be removed. In this case, the inner rib 33 of the first air guide 28 overlaps the rib 43 of the second air guide 41, thereby forming the labyrinthine structure. Also in this structure, air leakage from the air collecting space 45 is reduced.

In the example embodiment shown in FIG. 5, the bellows duct 50 is formed on the second air guide 41. Alternatively, the bellows duct 50 can be formed on the first air guide 28.

In the example embodiments shown in FIGS. 2 to 5, the second Peltier module 12 is located adjacent to the second air guide 41 located at the downstream end of the air distribution duct 10. The location of the second Peltier module 12 is not limited to the above position. For example, the second Peltier module 12 can be arranged adjacent to the upstream end of the air distribution duct 10. That is, the second Peltier module 12 can be arranged adjacent to the discharge portion of the cushion fan 4 in the air distribution duct 10. Also in this structure, the air leakage at the flexible connecting part between the first air guide 28 and the second air guide 41 is reduced. Accordingly, the conditioned air is effectively blown toward the back or hip of the passenger on the seat.

Further, the second Peltier module 12 can be deleted. In this case, the branch part 6 is formed at a position downstream of the Peltier blowing port 8. Namely, the upstream end of the air distribution duct 10 is connected to the Peltier blowing port 8. Thus, the air having passed through the first Peltier module 7 is divided into the seat cushion 3 and the air distribution duct 10. Accordingly, the air having passed through the first Peltier module 7 is introduced toward the seat back 2.

In the above example embodiment, the cooled air, which has been cooled through the Peltier modules 7, 12, is blown toward the seat cover 21. Further, the seat air conditioning unit can perform a heating operation. In this case, the electric current is supplied to the Peltier elements in the direction opposite to the direction of the cooling operation.

The example embodiments of the present invention are described above. However, the present invention is not limited to the above example embodiments, but may be implemented in other ways without departing from the spirit of the invention.

What is claimed is:

1. An air conditioning unit for a seat for introducing air to a surface of a seat back of the seat, the seat back having a cushion member that receives a load from a person seated on the seat and is formed with a seat back opening through which air flows and a back board disposed on a rear side of the cushion member, the cushion member and the back board defining a space therebetween, the air conditioning unit comprising:

a first air guide disposed in the space defined between the cushion member and the back board, the first air guide having an upstream portion and a downstream portion, the upstream portion defining an inlet port on the rear side of the cushion member, the downstream portion opening to the seat back opening of the cushion member, the first air guide disposed movable toward the back board to follow an elastic deformation of the cushion member;

a second air guide disposed on the back board, the second air guide having a suction opening for sucking air therein and an outlet port opening on a side of the cushion member; and a movable connecting part that relatively movably connects the outlet port of the second air guide and the inlet port of the first air guide according to the elastic deformation of the cushion member while defining an air passage for permitting air discharged from the outlet port to the inlet port, wherein the movable connecting part is constructed of a first engaging portion defined by a periphery of the inlet port and a second engaging portion defined by a periphery of the outlet port, the first engaging portion and the second engaging portion engage and slide relative to each other, one of the first engaging portion and the second engaging portion has a double-layer structure including an outer rib and an inner rib, and the other one of the first engaging portion and the second engaging portion has a rib that is received in a recessed portion defined between the outer rib and the inner rib.

2. The air conditioning unit according to claim 1, further comprising:

a back fan disposed in the first air guide, wherein the back fan defines the inlet port as a suction port and blows air sucked from the suction port to the seat cushion opening.

3. The air conditioning unit according to claim 1, further comprising:

a cushion fan mounted to a seat cushion of the seat; and
an air distribution duct defining an air passage space therein, wherein the air distribution duct has a first end through which air blown by the cushion fan is introduced in the air passage space and a second end communicating with the suction opening of the second air guide.

4. The air conditioning unit according to claim 3, further comprising:

a Peltier module disposed in the air distribution duct for cooling and heating air passing through the air distribution duct with electric conduction.

5. The air conditioning unit according to claim 4, wherein the Peltier module is located adjacent to the second end of the air distribution duct.

6. The air conditioning unit according to claim 4, wherein the Peltier module is located adjacent to the first end of the air distribution duct.

7. The air conditioning unit according to claim 3, wherein the vehicle has a compartment air conditioner including a rear foot duct and the seat is a rear seat, wherein the rear foot duct defines an opening at a position adjacent to the cushion fan for introducing air discharged from the compartment air conditioner toward a lower area of the rear seat.

* * * * *

UNITED STATES PATENT AND TRADEMARK OFFICE
CERTIFICATE OF CORRECTION

PATENT NO. : 7,275,984 B2 Page 1 of 1
APPLICATION NO. : 11/472266
DATED : October 2, 2007
INVENTOR(S) : Shinji Aoki It is certified that error appears in the above-identified patent and that said Letters Patent is hereby corrected as shown below:

Title page, ITEM (73) ASSIGNEE; ADD
-- (73) Assignee: DENSO Corporation   Kariya (JP) --

Signed and Sealed this

Twenty-sixth Day of February, 2008

JON W. DUDAS
*Director of the United States Patent and Trademark Office*